(12) United States Patent
Wimberger (10) Patent No.: US 7,484,948 B2
(45) Date of Patent: Feb. 3, 2009

(54) INJECTION MOLDING MACHINE WITH VERTICAL PLASTICIZING UNIT

(75) Inventor: Klaus Wimberger, Gräfelfing (DE)

(73) Assignee: Krauss-Maffei Kunststofftechnik GmbH, München (DE)

(*) Notice: Subject to any disclaimer, the term of this patent is extended or adjusted under 35 U.S.C. 154(b) by 0 days.

(21) Appl. No.: 11/748,535

(22) Filed: May 15, 2007

(65) Prior Publication Data

US 2007/0212445 A1 Sep. 13, 2007

Related U.S. Application Data

(63) Continuation of application No. PCT/EP2005/055920, filed on Nov. 11, 2005.

(30) Foreign Application Priority Data

Nov. 26, 2004 (DE) .................. 10 2004 057 164

(51) Int. Cl.
B29C 45/13 (2006.01)
(52) U.S. Cl. .................. 425/112; 425/567; 425/576
(58) Field of Classification Search .................. 425/572, 425/574, 575, 576, 130, 134, 190, 192 R, 425/112, 567
See application file for complete search history.

(56) References Cited

U.S. PATENT DOCUMENTS

| | | | | |
|---|---|---|---|---|
| 2,333,601 A | * | 11/1943 | Tucker | 425/156 |
| 3,100,913 A | * | 8/1963 | De Matteo | 425/137 |
| 3,838,961 A | * | 10/1974 | Yogosawa et al. | 425/526 |
| 3,880,560 A | * | 4/1975 | Takahashi | 425/130 |
| 4,044,925 A | * | 8/1977 | Mercer | 222/263 |
| 4,243,362 A | * | 1/1981 | Rees et al. | 425/130 |
| 4,330,257 A | * | 5/1982 | Rees et al. | 425/556 |
| 4,704,078 A | * | 11/1987 | Hehl | 425/185 |
| 4,726,558 A | * | 2/1988 | Ozone et al. | 248/68.1 |
| 4,734,023 A | * | 3/1988 | Nesch et al. | 425/130 |
| 4,753,589 A | * | 6/1988 | Hehl | 425/186 |
| 4,786,455 A | * | 11/1988 | Krishnakumar et al. | 264/237 |
| 5,145,353 A | * | 9/1992 | Zakich | 425/588 |

(Continued)

FOREIGN PATENT DOCUMENTS

DE 199 37 200 A1 2/2001

(Continued)

OTHER PUBLICATIONS

Johannaber F et al.: "Handbuch Spritzgiessen, Passage", Handbuch Spritzgiessen, 2002, pp. 506-509, XP002299967, Fig. 6.80.

Primary Examiner—Eric Hug
Assistant Examiner—Seyed Masoud Malezadeh
(74) Attorney, Agent, or Firm—Henry M. Feiereisen; Ursula B. Day (57) ABSTRACT

An injection molding machine includes a clamping unit constructed for support of at least two molding tools to provide at least two different cavities. A first plasticizing unit is provided for charging one of the cavities in one of the molding tools, and a second plasticizing unit is provided for charging the other one of the cavities in the other one of the molding tools. The second plasticizing unit is hereby attached to a mounting in a substantially vertical orientation. The mounting may be mounted on one of the platens of the injection molding machine or on a frame which extends above the clamping unit.

7 Claims, 6 Drawing Sheets

U.S. PATENT DOCUMENTS

| | | | |
|---|---|---|---|
| 5,388,983 A * | 2/1995 | Hehl | 425/575 |
| 5,551,862 A * | 9/1996 | Allred, Jr. | 425/532 |
| 5,681,596 A * | 10/1997 | Mills et al. | 425/532 |
| 5,773,049 A * | 6/1998 | Kashiwa et al. | 425/572 |
| 5,817,345 A * | 10/1998 | Koch et al. | 425/130 |
| 6,139,305 A * | 10/2000 | Nesch | 425/130 |
| 6,352,427 B1 | 3/2002 | Hahn et al. | |
| 6,517,337 B1 * | 2/2003 | Hehl | 425/190 |
| 6,558,149 B1 * | 5/2003 | Bodmer et al. | 425/192 R |
| 6,592,356 B1 * | 7/2003 | Lust et al. | 425/192 R |
| 6,630,090 B1 * | 10/2003 | Nagaoka | 264/255 |
| 6,709,251 B2 * | 3/2004 | Payette et al. | 425/112 |
| 6,783,346 B2 * | 8/2004 | Bodmer et al. | 425/112 |
| 6,821,100 B2 * | 11/2004 | Kroeger et al. | 425/112 |
| 6,830,448 B2 * | 12/2004 | Lichtinger | 425/576 |
| 6,923,633 B2 * | 8/2005 | Rudolph et al. | 425/130 |
| 7,018,189 B2 * | 3/2006 | Wobbe et al. | 425/112 |
| 7,186,113 B2 * | 3/2007 | Lichtinger | 425/576 |
| 7,314,362 B2 * | 1/2008 | Lichtinger | 425/112 |
| 2001/0004930 A1 * | 6/2001 | Takizawa et al. | 164/312 |
| 2002/0132891 A1 * | 9/2002 | Azechi et al. | 524/261 |
| 2003/0175380 A1 * | 9/2003 | Dantlgraber | 425/589 |
| 2004/0052894 A1 * | 3/2004 | Rudolph et al. | 425/595 |
| 2005/0019443 A1 * | 1/2005 | Boyd et al. | 425/556 |

FOREIGN PATENT DOCUMENTS

| | | |
|---|---|---|
| DE | 201 15 204 U | 1/2002 |
| DE | 101 38 087 A1 | 2/2003 |
| DE | 10214466 A1 * | 10/2003 |
| EP | 0 794 046 A | 9/1997 |
| EP | 1340607 A1 * | 9/2003 |
| WO | WO 2005/007381 | 1/2005 |

* cited by examiner

INJECTION MOLDING MACHINE WITH VERTICAL PLASTICIZING UNIT

CROSS-REFERENCES TO RELATED APPLICATIONS

This application is a continuation of prior filed copending PCT International application no. PCT/EP2005/055920, filed Nov. 11, 2005, which designated the United States and has been published but not in English as International Publication No. WO 2006/056539 A1 and on which priority is claimed under 35 U.S.C. §120 and which claims the priority of German Patent Application, Serial No. 10 2004 057 164.3, filed Nov. 26, 2004, pursuant to 35 U.S.C. 119(a)-(d), the contents of which are incorporated herein by reference in its entirety as if fully set forth herein.

BACKGROUND OF THE INVENTION

The present invention relates, in general, to the field of injection molding machines.

Nothing in the following discussion of the state of the art is to be construed as an admission of prior art.

A typical injection molding machine includes a clamping unit for support of at least two molding tools to provide at least two different cavities for production of multicomponent products. The clamping unit may be constructed as a stack mold or include an intermediate plate in the form of a sliding plate or a swivel plate. As a result, the overall injection molding machine is of drawn-out construction whose footprint is substantial. Examples of such injection molding machines include German Offenlegungsschriften DE 199 37 200 and DE 101 38 087.

It would therefore be desirable and advantageous to provide an improved injection molding machine to obviate prior art shortcomings

SUMMARY OF THE INVENTION

According to one aspect of the present invention, an injection molding machine includes a clamping unit constructed for support of at least two molding tools to provide at least two different cavities, a first plasticizing unit for charging one of the cavities in one of the molding tools, a second plasticizing unit for charging the other one of the cavities in the other one of the molding tools, and a mounting for attachment of the second plasticizing unit in a substantially vertical orientation.

The present invention resolves prior art problems by orienting one of the plasticizing units in a substantially vertical direction. In order to be clear on this point, it is to be understood that the term "substantially vertical direction" includes a positioning of the one plasticizing unit at an angle ranging from about 45° to 90°. In other words, the benefits of the invention can be realized even though the axis of the plasticizing unit is not coincidental with the vertical but rather may be slanted up to an angle of about 45° in relation to the vertical.

According to another feature of the present invention, at least two platens may be provided, wherein the mounting may be secured to one of the platens. As an alternative, a frame may be disposed above the clamping unit, with the mounting being secured to the frame.

The clamping unit may be constructed as a stack mold or include an intermediate plate. In the latter case, the intermediate plate is positioned between the platens, with one of the molding tools being disposed between the intermediate plate and one of the platens, and the other one of the molding tools being disposed between the intermediate plate and the other one of the platens. The intermediate plate may be constructed for movement in a linear direction and/or rotation. When the intermediate plate is constructed for rotation, the use of a swivel plate with clocked reversal becomes also possible.

According to another feature of the present invention, the mounting and the second plasticizing unit can be constructed and positioned such that the plasticizing cylinder of the second plasticizing unit is arranged at an end face outside of the clamping unit, and a melt deflection device may be provided which is connected or connectable to the second plasticizing unit for introduction of plastic melt, produced by the second plasticizing unit, into the associated one of the cavities.

According to another feature of the present invention, the frame for attachment of the mounting may be supported, at least in part, on a machine bed. It is, of course, also conceivable to support the frame on the ground or any level surface on which the machine bed is placed. The frame may envelope the entire clamping unit or only part thereof.

According to another feature of the present invention, the mounting may be arranged on the frame for linear movement in opening and closing directions of the clamping unit. As a result, the position of the injection unit can be adjusted for different molding tools. Suitably, the frame supports two guide rails extending in parallel relationship in a longitudinal direction of the clamping unit for guiding the mounting in linear direction.

According to another feature of the present invention, the second plasticizing unit may be arranged on the mounting for up and down movements. As a result, the clamping unit can be retracted in relation to the molding tool as well as to the melt deflection device.

According to another feature of the present invention, one of the platens may be fixed and the other one of the platens may be mobile. It is, of course, also conceivable to construct both platens for mobility.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
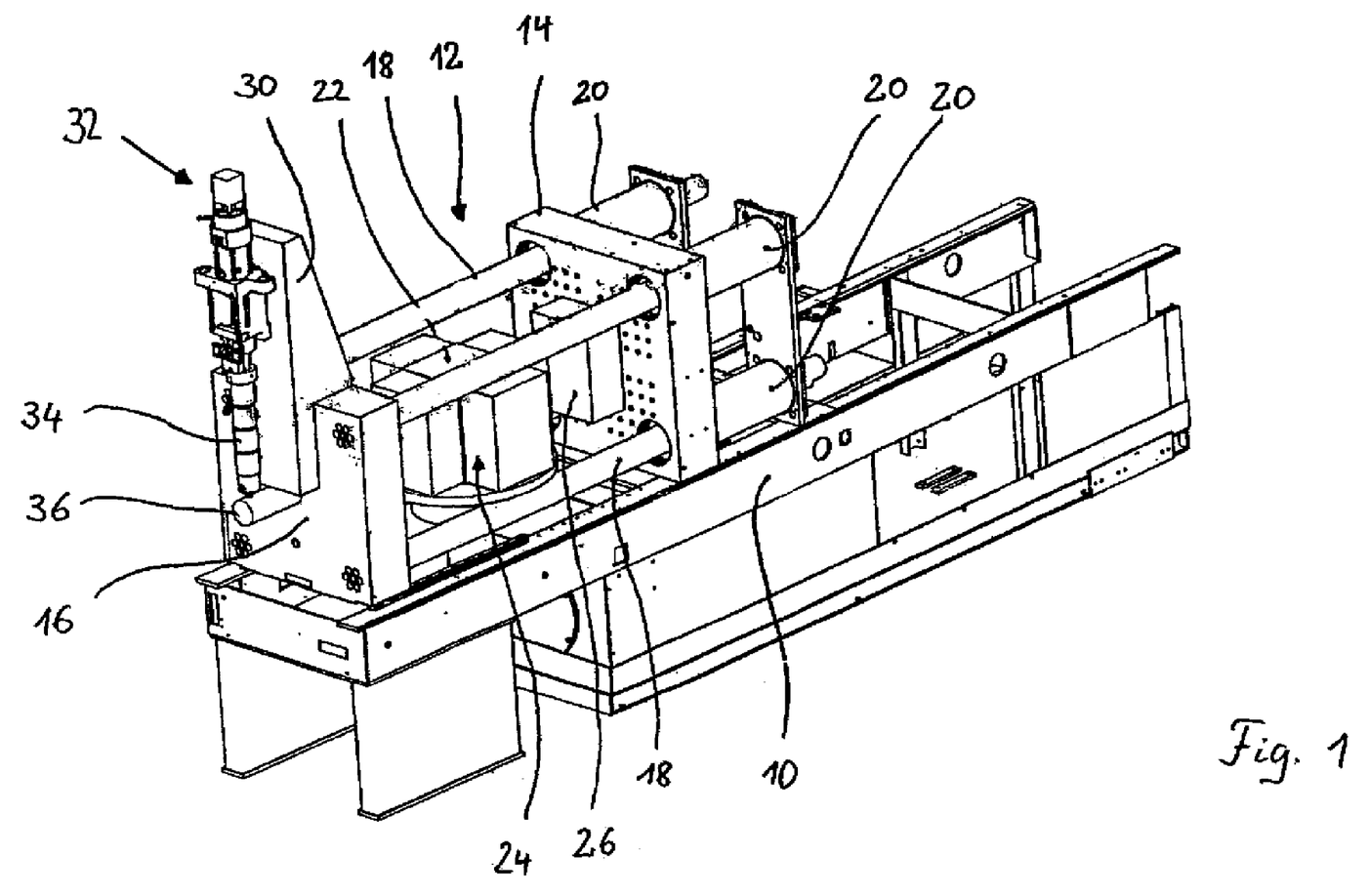
FIG. 1 is a schematic perspective view of a first embodiment of an injection molding machine according to the present invention.

Turning now to the drawing, and in particular to FIG. 1, there is shown a schematic perspective view of a first embodiment of an injection molding machine according to the present invention, including a clamping unit, generally designated by reference numeral 12 and mounted onto a machine bed 10. The injection molding machine includes an unillustrated first plasticizing unit which is positioned to the right of the clamping unit 12, and a second plasticizing unit, generally designated by reference numeral 32 and described in more detail hereinafter.

The clamping unit 12 includes a fixed platen 14 which is supported on the machine bed 10 and a moving platen 16 which is movable back and forth along unlabeled rails on the machine bed 10. A swivel plate arrangement with a swivel plate 22 and a drive for the swivel plate 22 is arranged between the platens 14, 16, as clearly shown in FIG. 2. Although not shown in the drawings, the swivel plate 22 is also operated by a separate drive for back-and-forth movement in opening and closing directions of the clamping unit 12. The swivel plate 22, which constitutes an intermediate plate and has a generally block-shaped configuration, carries on all four sides of the block parts of a molding tool 24. Through incremental turning of the swivel plate 22 by 90°, the individual parts of the molding tools can be successively exchanged.

Figure 2:
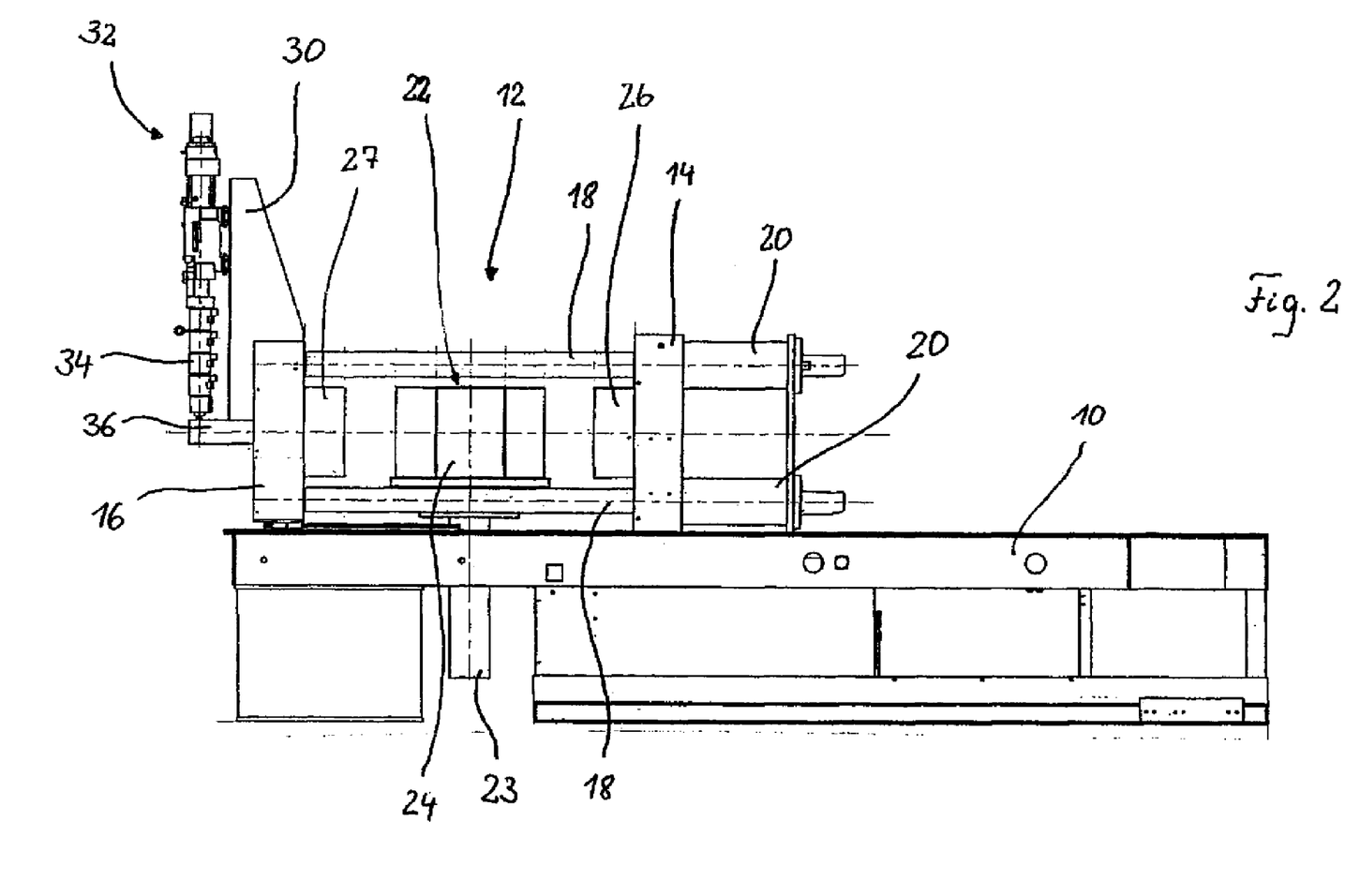
FIG. 2 is a schematic side view of the injection molding machine of FIG. 1.
Figure 3:
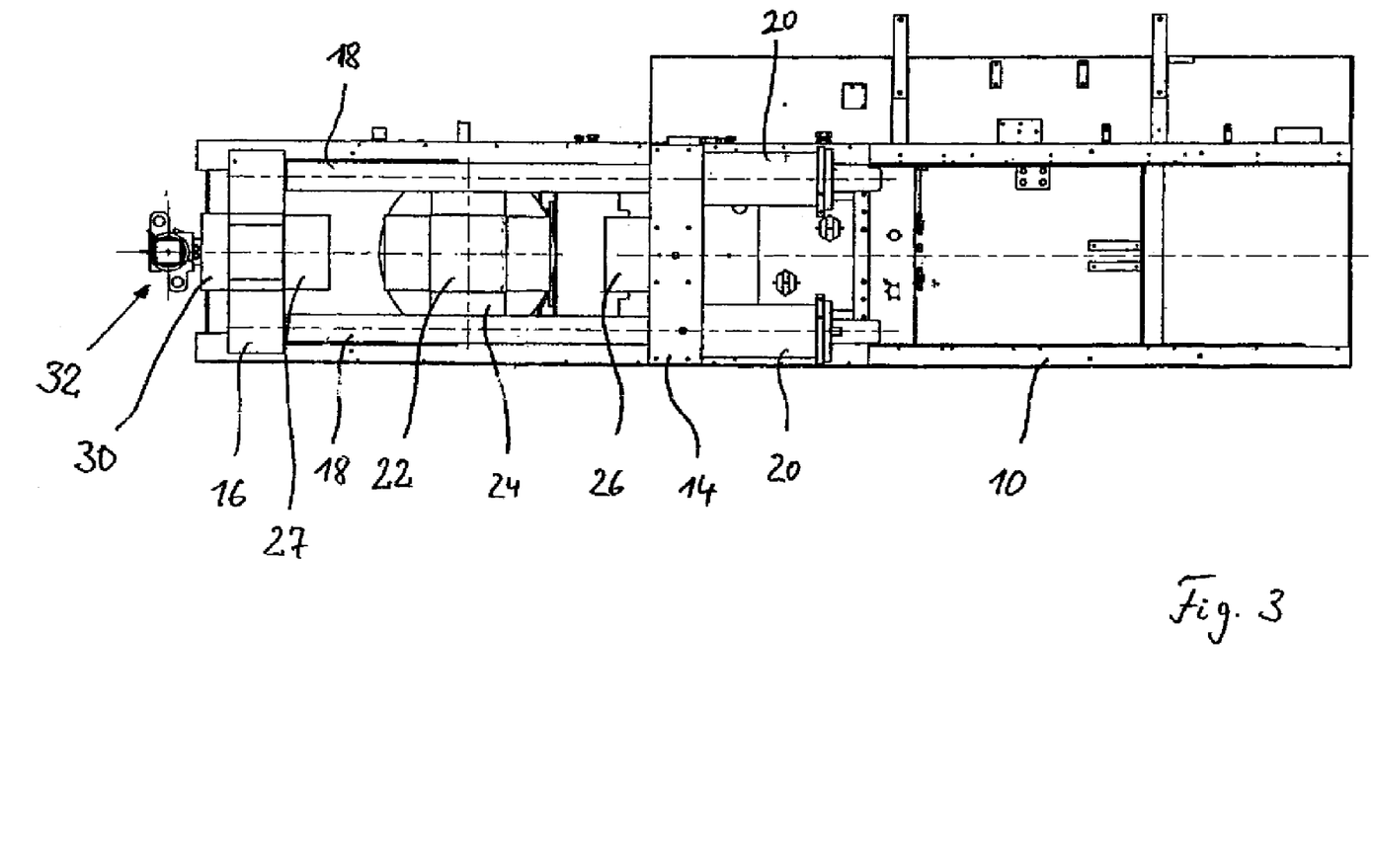
FIG. 3 is a schematic top view of the injection molding machine of FIG. 1.

As shown in particular in FIGS. 2 and 3, the fixed platen 14 carries a part of a molding tool 26, and the moving platen 16 carries a part of a molding tool 27. In a closed position of the clamping unit 12, the molding tool parts 26, 27 form with the molding tool parts 24 a first cavity (half-mold 24 and half mold 26) as well as a second cavity (half-mold 24 and half mold 27). The clamping pressure between both platens 14, 16 with in-between swivel platen 22 is realized in a manner known per se via tie bars and a hydraulic clamping unit for applying the clamping pressure.

As shown in FIGS. 1-3, the second plasticizing unit 32 is arranged on the moving platen 16 in a vertical disposition. A mounting 30 is hereby secured to the top of the platen 16 for attachment of the plasticizing unit 32 which has a plasticizing cylinder 34 situated at the end face of the mounting outside of the clamping unit 12. In other words, the plasticizing cylinder 34 is situated outside of the moving platen 16 at a distance thereto.

A melt deflection device 36 is mounted to the moving platen 16 and extends there through to port into the cavity of the closed molding tools 24, 27. The plasticizing cylinder 34 can be connected to the melt deflection device 36 so that melt produced in the plasticizing unit 32 can be introduced via the melt deflection device 36 into the cavity. Although not shown in the drawings, it will be understood by persons skilled in the art that the melt deflection device 36 may, of course, include further elements, such as a hot runner or a nozzle shut-off device.

The injection molding machine, described in FIGS. 1-3, is of compact configuration, even when used with a swivel plate type clamping unit for the production of multicomponent products.

Figure 4:
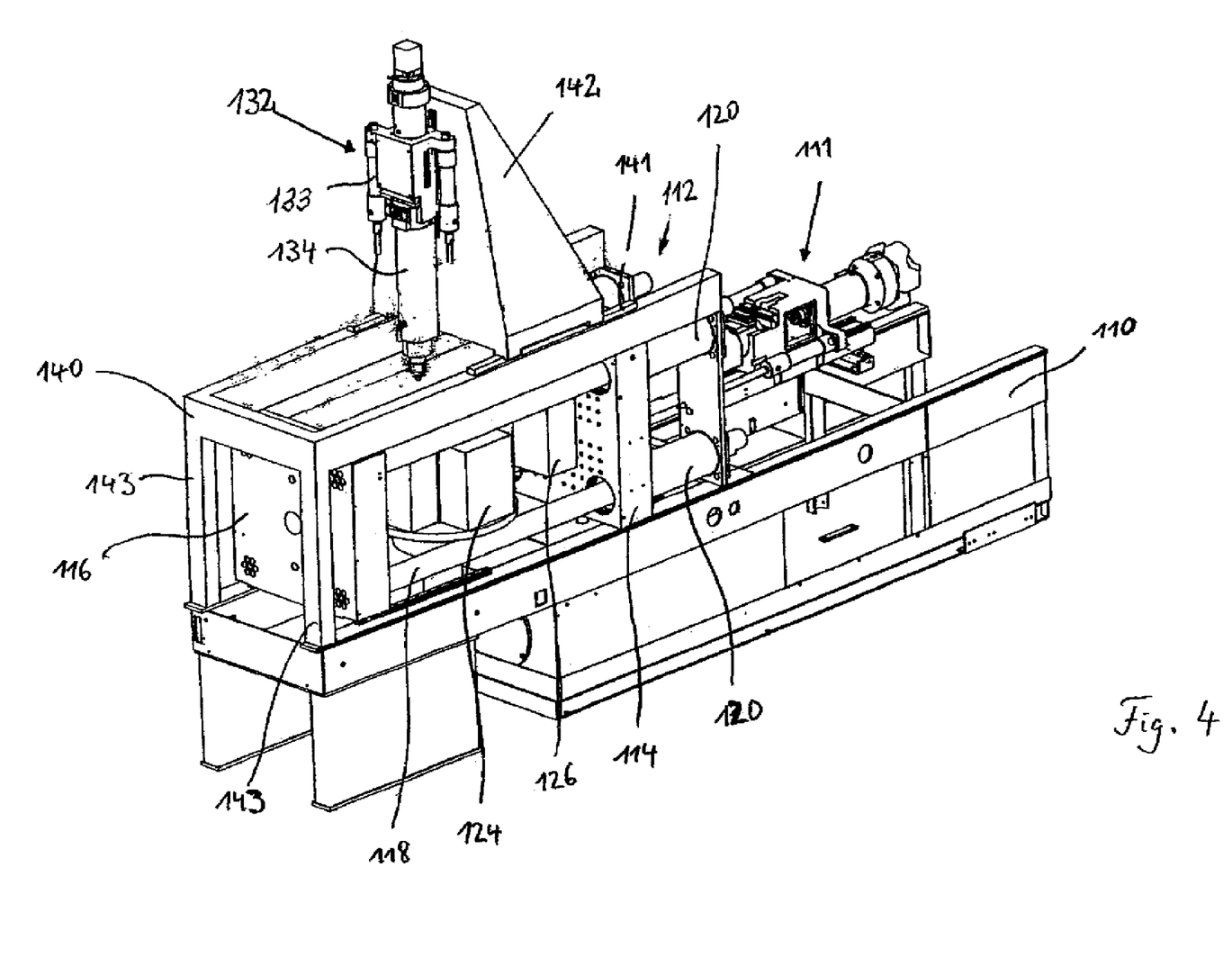
FIG. 4 is a schematic perspective view of a second embodiment of an injection molding machine according to the present invention.
Figure 5:
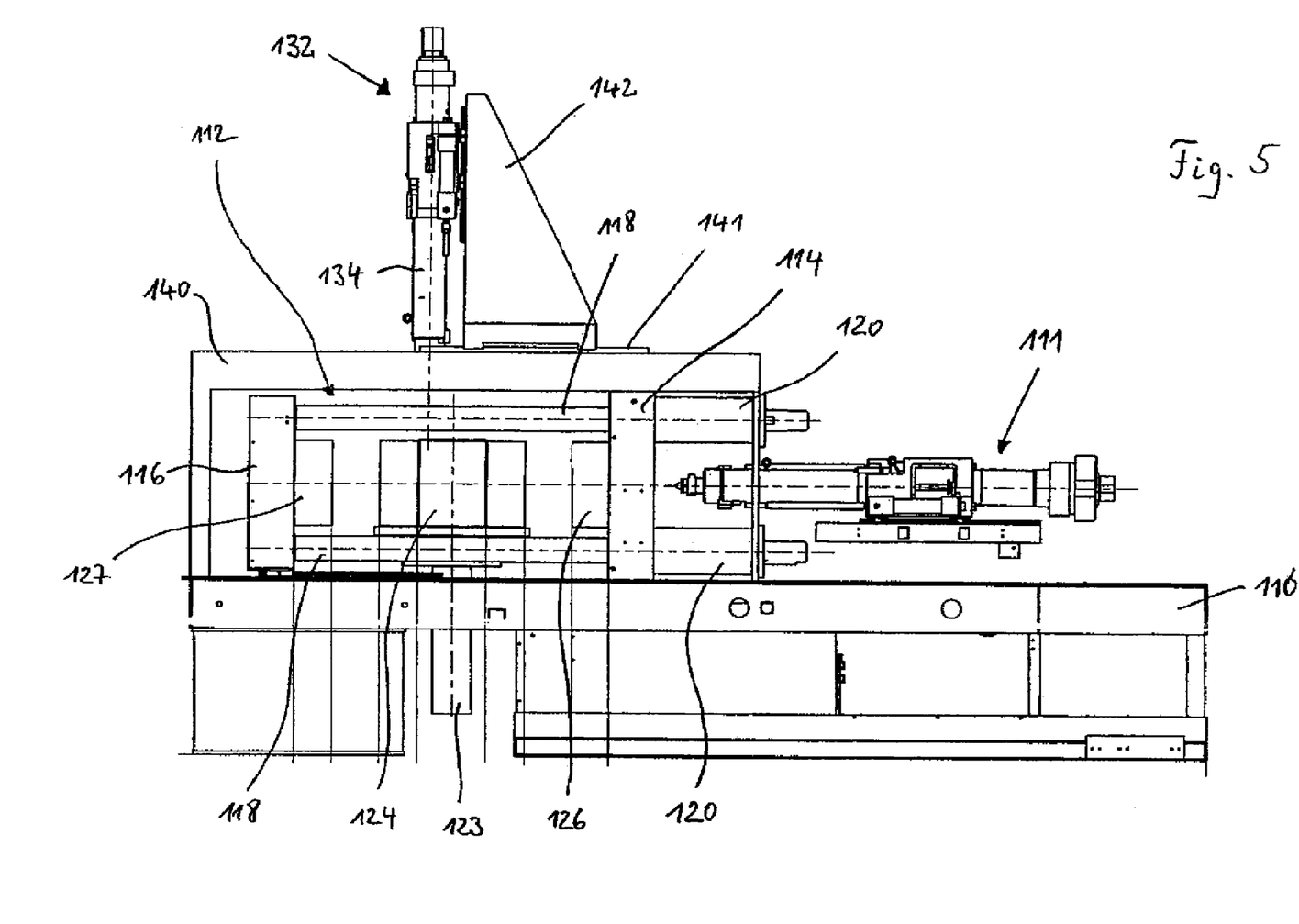
FIG. 5 is a schematic side view of the injection molding machine of FIG. 4.
Figure 6:
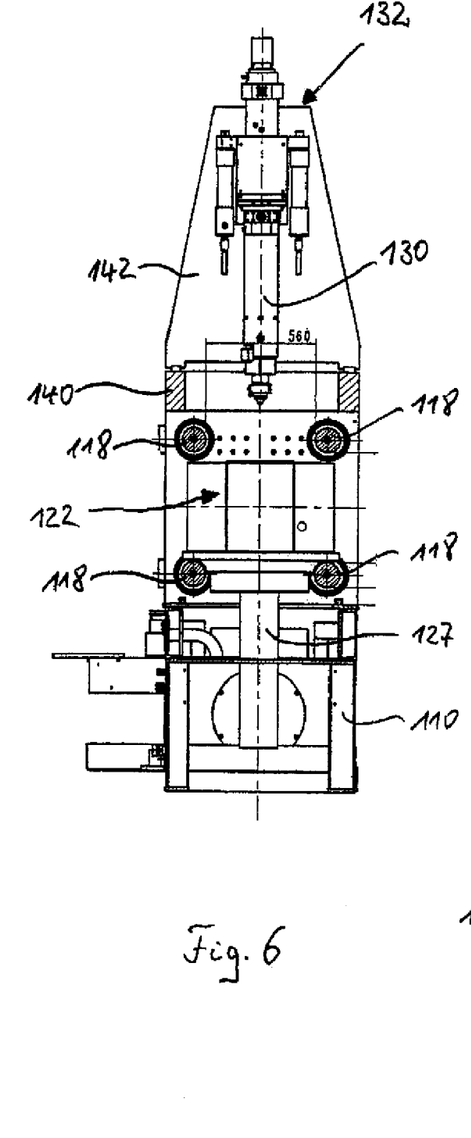
FIG. 6 is a sectional view of the injection molding machine of FIG. 4.
Figure 7:
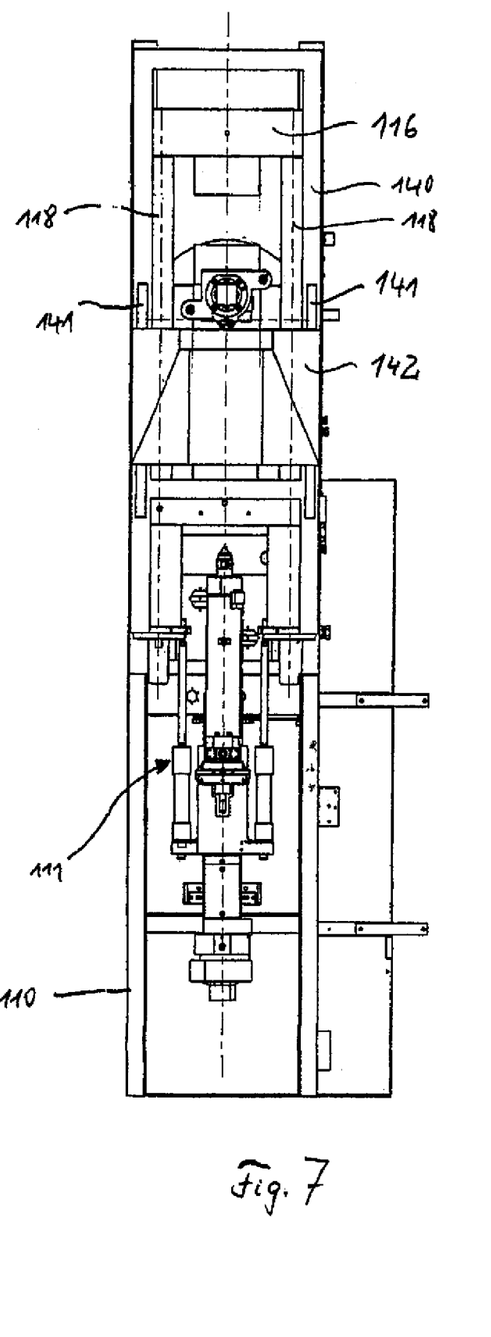
FIG. 7 is a schematic top view of the injection molding machine of FIG. 4.

Referring now to FIG. 4, there is shown a schematic perspective view of a second embodiment of an injection molding machine according to the present invention. In the following description, parts corresponding with those in FIGS. 1-3 will be identified, where appropriate for the understanding of the invention, by corresponding reference numerals, each increased by "100". The injection molding machine of FIG. 4 includes a clamping unit 112 which is mounted onto a machine bed 110. To the right of the clamping unit is the first plasticizing unit 111 which is positioned outside of the fixed platen 114. In addition to the fixed platen 114, the clamping unit 112 includes a moving platen 116, with the fixed and moving platens 114, 116 being interconnected by four tie bars 118. The clamping pressure is generated by hydraulic cylinders 120 through intervention of the tie bars 118. A swivel plate 122 is positioned between the platens 114, 116 for attachment of molding tools 124. The molding tools 124 interact with complementary molding tools 126, 127 in a manner as described with reference to the injection molding machine of FIGS. 1-3.

In the embodiment of the injection molding machine of FIGS. 4-7, the second plasticizing unit 132 is secured to a mounting 142 which is connected to a frame 140. The frame 140 extends essentially over the clamping unit 112 and is supported on one end by two uprights 143 behind the moving platen 116 and on the other end by the fixed platen 114. Mounted to the topside of the frame 140 are two guide rails 141 which extend in spaced-apart parallel relationship longitudinally in the direction of the clamping unit 112. The mounting 142 is guided along the guide rails 141 for linear movement.

The second plasticizing unit 132 includes a plasticizing cylinder 134 and two hydraulic cylinders 133 for realizing up and down movements of the plasticizing cylinder 134.

Depending on the dimension of the molding tools 124, 126, 127, the plasticizing unit 132 can be positioned precisely and accurately in relation to an injection opening by the movable mounting 142. The capability to move up and down enables the plasticizing unit 132 to move downwards, when the molding tool is closed, for injection of melt into the cavity. The plasticizing unit 132 moves up again, before the molding tool is opened.

The injection molding machine of FIGS. 4-7 has overall also a relatively small footprint and requires thus little space.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. An injection molding machine, comprising:
a clamping unit having platens in axial spaced-apart relationship for support of molding tools in one to-one correspondence to provide at least two different cavities;
a first plasticizing unit constructed to convert plastic material into plastic melt for injection of plastic melt into one of the cavities;
a second plasticizing unit having a plasticizing cylinder and constructed to convert plastic material into plastic melt for injection of plastic melt into another one of the cavities;

a mounting received by one of the platens and carrying the second plasticizing unit in a vertical orientation, wherein the plasticizing cylinder of the second plasticizing unit is arranged at an axial distance to an outer end face of the clamping unit; and a melt deflection device connected to the second plasticizing unit for deflection of plastic melt, produced by the second plasticizing unit, through the one platen and the molding tool supported thereon into the other one of the cavities.

2. The injection molding machine of claim 1, further comprising an intermediate plate between the platens, with one of the molding tools being disposed between the intermediate plate and one of the platens, and the other one of the molding tools being disposed between the intermediate plate and the other one of the platens.

3. The injection molding machine of claim 2, wherein the intermediate plate is constructed for movement in a linear direction and/or rotation.

4. The injection molding machine of claim 1, wherein the second plasticizing unit is arranged on the mounting for up and down movements.

5. The injection molding machine of claim 1, wherein one of the platens is fixed and the other one of the platens is mobile.

6. The injection molding machine of claim 1, wherein the platens are mobile.

7. The injection molding machine of claim 1, wherein the second plasticizing unit is positioned at an angle in a range of about 45° to 90° in relation to a horizontal.

* * * * *